(12) United States Patent
Nakazawa et al.

(10) Patent No.: US 9,722,507 B2
(45) Date of Patent: Aug. 1, 2017

(54) ELECTRIC POWER CONVERSION APPARATUS

(71) Applicant: Kabushiki Kaisha Toshiba, Minato-ku (JP)

(72) Inventors: Yosuke Nakazawa, Kunitachi (JP); Takeru Murao, Warabi (JP); Shunsuke Tamada, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 5 days.

(21) Appl. No.: 14/702,417

(22) Filed: May 1, 2015

(65) Prior Publication Data

US 2015/0236611 A1 Aug. 20, 2015

Related U.S. Application Data

(63) Continuation of application No. PCT/JP2013/079976, filed on Nov. 6, 2013.

(30) Foreign Application Priority Data

Nov. 29, 2012 (JP) .................................. 2012-260951

(51) Int. Cl.
*H02M 7/5387* (2007.01)
*H02M 7/06* (2006.01)
*H02M 7/46* (2006.01)

(52) U.S. Cl.
CPC .............. *H02M 7/06* (2013.01); *H02M 7/46* (2013.01)

(58) Field of Classification Search
CPC ...... H01H 47/325; H02M 1/32; G06F 2/1022; G06F 1/1635; B23K 9/1087; H01P 3/34; H01P 5/18

(Continued)

(56) References Cited

U.S. PATENT DOCUMENTS

| 4,133,026 A | 1/1979 | Häusler | |
| 5,418,707 A * | 5/1995 | Shimer | H01J 37/241 |
| | | | 307/82 |

(Continued)

FOREIGN PATENT DOCUMENTS

| CN | 101795057 A | 8/2010 |
| CN | 101964596 A | 2/2011 |

(Continued)

OTHER PUBLICATIONS

International Search Report mailed Feb. 10, 2014 for PCT/JP2013/079976 filed Nov. 6, 2013 with English Translation.

(Continued)

*Primary Examiner* — Rajnikant Patel
(74) *Attorney, Agent, or Firm* — Oblon, McClelland, Maier & Neustadt, L.L.P.

(57) ABSTRACT

An electric power conversion apparatus according to an embodiment includes, wherein when a constituent element constituted of a leg in which two switching elements provided with self-arc-extinguishing capability are connected in series, and a capacitor connected in parallel with the leg is made a converter unit, and a constituent element formed by connecting one or more converter units in series is made a phase arm, a phase arm on the positive side, a single-phase four-winding transformer, and a phase arm on the negative side are included in each of three phases, one end of the phase arm on the positive side is connected to the positive side of a secondary winding of the four-winding transformer, and the other end thereof is connected to a DC positive side terminal.

4 Claims, 7 Drawing Sheets

(58) Field of Classification Search
USPC ......... 363/16–17, 21.12, 21.16, 37, 39, 131, 363/132; 361/42, 49, 50, 100, 187, 206, 361/170; 307/24, 64, 66, 77
See application file for complete search history.

(56) References Cited

U.S. PATENT DOCUMENTS

| | | | | |
|---|---|---|---|---|
| 6,005,788 | A * | 12/1999 | Lipo | H02M 7/49 363/71 |
| 7,330,363 | B2 * | 2/2008 | Ponnaluri | H02M 7/49 323/361 |
| 8,547,718 | B2 * | 10/2013 | Katoh | H02M 1/088 363/131 |
| 8,792,261 | B2 * | 7/2014 | Inoue | H02M 7/217 363/129 |
| 8,830,647 | B2 * | 9/2014 | Chen | H02H 9/02 361/13 |
| 9,379,632 | B2 * | 6/2016 | Akagi | H02J 3/1857 |
| 2011/0019449 | A1 | 1/2011 | Katoh et al. | |
| 2012/0026767 | A1 | 2/2012 | Inoue et al. | |
| 2014/0254226 | A1 | 5/2014 | Nakazawa et al. | |

FOREIGN PATENT DOCUMENTS

| | | |
|---|---|---|
| CN | 101976956 A | 2/2011 |
| CN | 102013813 A | 4/2011 |
| CN | 102630369 A | 8/2012 |
| CN | 102780416 A | 11/2012 |
| JP | 06-133562 A | 5/1994 |
| JP | 2004-032998 A | 1/2004 |
| JP | 2006-129572 A | 5/2006 |
| JP | 4345640 B2 | 10/2009 |
| JP | 2010-233411 A | 10/2010 |
| JP | 2010-239723 A | 10/2010 |
| JP | 2011-024392 A | 2/2011 |
| JP | 2011-223735 A | 11/2011 |
| JP | 2014-230438 A | 12/2014 |
| JP | 2015-012749 A | 1/2015 |
| WO | WO 2011/114816 A1 | 9/2011 |

OTHER PUBLICATIONS

International Written Opinion mailed Feb. 10, 2014 for PCT/JP2013/079976 filed Nov. 6, 2013.
Hartmut Huang, "Multilevel Voltage-Sourced Converters for HVDC and FACTS Applications", Siemens AG, Energy Sector (Germany), Cigr SC B4 2009, Paper 401, 2009.
Japanese Office Action issued Nov. 8, 2016 in patent application No. 2012-260951 with English translation.
Combined Office Action and Search Report issued Sep. 5, 2016 in Chinese Application No. 201380051187.1 (with English translation).
Extended European Search Report issued Feb. 13, 2017 in Patent Application No. 13858780.3.

* cited by examiner

ELECTRIC POWER CONVERSION APPARATUS

CROSS REFERENCE TO RELATED APPLICATIONS

This application is a Continuation Application of PCT Application No. PCT/JP2013/079976, file Nov. 6, 2013 and based upon and claiming the benefit of priority from Japanese Patent Application No. 2012-260951, filed Nov. 29, 2012, the entire contents of all of which are incorporated herein by reference.

TECHNICAL FIELD

The present invention relates to an electric power conversion apparatus configured to convert electric power from DC or AC to AC or DC.

BACKGROUND ART

Heretofore, as a power converter configured to convert AC power of an electric power system into DC power or an electric power conversion apparatus configured to convert DC power to AC power to drive a motor, a three-phase two-level converter or a three-phase two-level inverter has been employed. A three-phase two-level inverter is constituted of a minimum necessary number of six semiconductor switching elements required to constitute an electric power conversion apparatus configured to convert DC power into three-phase AC power, and hence downsizing and cost reduction can be realized.

On the other hand, regarding an output voltage waveform thereof, when an input DC voltage is Vdc, switching to two values +Vdc/2, and −Vdc/2 is carried out for each phase by pulse-width modulation (PWM), and a waveform is a spuriously formed AC waveform. Besides, in a high-voltage motor drive device in which high-voltage switching elements are used, and the PWM switching frequency cannot be made high, and apparatus connected to a power system of DC power transmission or the like, a filter constituted of a reactor, and capacitor is inserted in the three-phase AC output in order to reduce switching harmonics. However, in order to reduce the harmonic components flowing into the power system to a level at which other devices are not adversely affected, the capacity of the filter becomes large, and an increase in cost, and an increase in weight are brought about.

Figure 6:
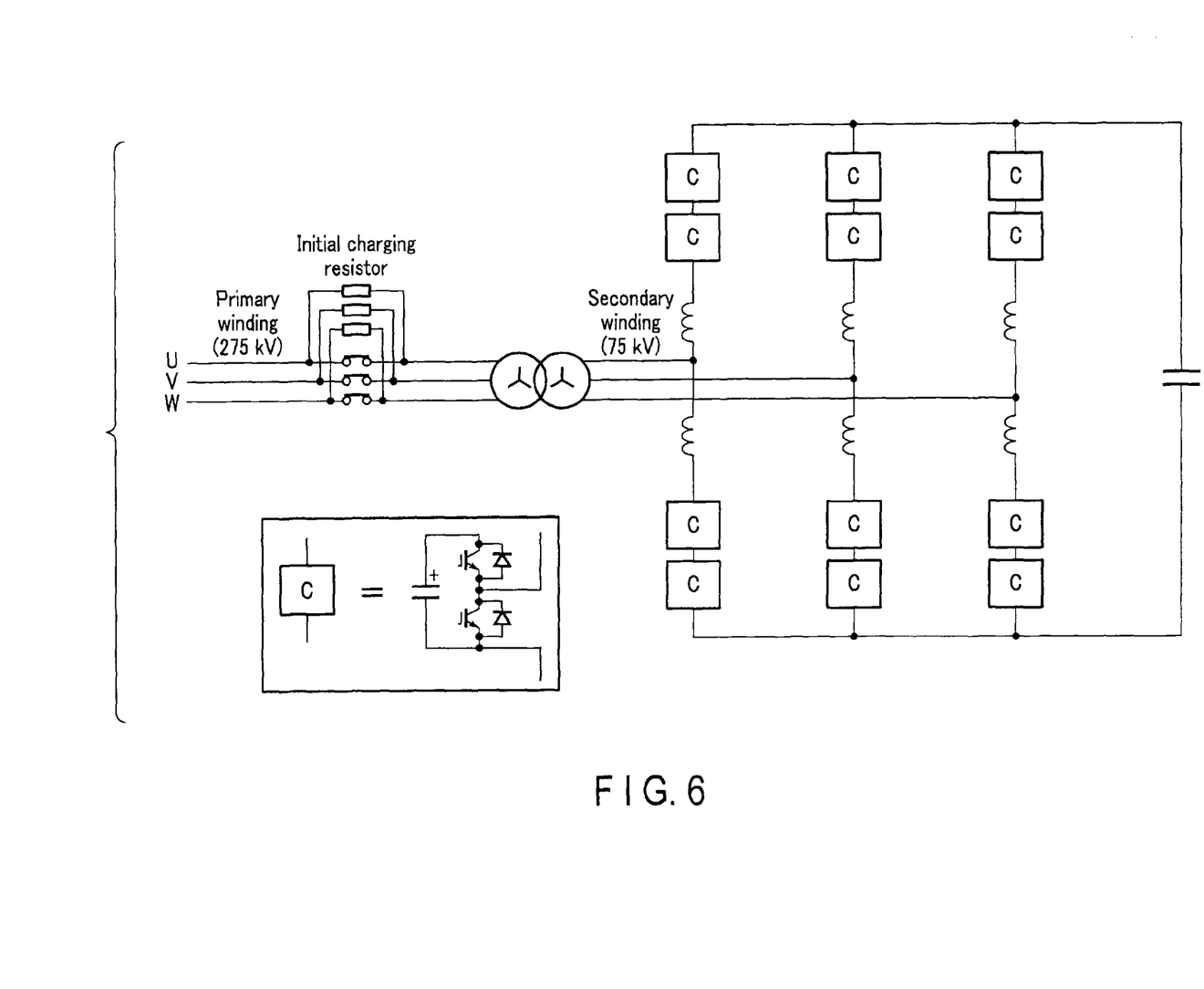
FIG. 6 is a view showing a configuration example of a conventional electric power converter.

Further, in the conventional circuit form, as in the case of a modular multilevel converter shown in FIG. 6, research and development of an electric power converter in which chopper circuits are connected in a multistage form, and which can convert a high voltage equal to the voltages of the power system, and distribution system is now advanced.

When such an electric power converter is put into practical use, a transformer heavy in weight, and large in volume, and having a high proportion of the cost of the whole system is simplified, and the output voltage/current waveform is made approximate to a sinusoidal waveform by the approach toward the multilevel state, and hence it is possible to have the benefit of eliminating the harmonic filter.

In this circuit form, in order to control the voltage value of the DC capacitor serving as a constituent element of each converter unit to be constant, it is necessary in principle to make a reflux current in the DC power supply flow at all times. The three phases of power are connected to one DC power supply, and hence when DC voltage resultant values of the respective phases differ from each other even to a small extent, there is a danger that an excessive short-circuit current flows between the phases to thereby destroy the apparatus. In order to prevent such an accident from occurring, a buffer reactor is inserted in each phase to thereby limit the short-circuit current, and prevent the short-circuit current from becoming excessively large. The buffer rectors bring about an increase in size and an increase in cost of the apparatus.

Figure 7:
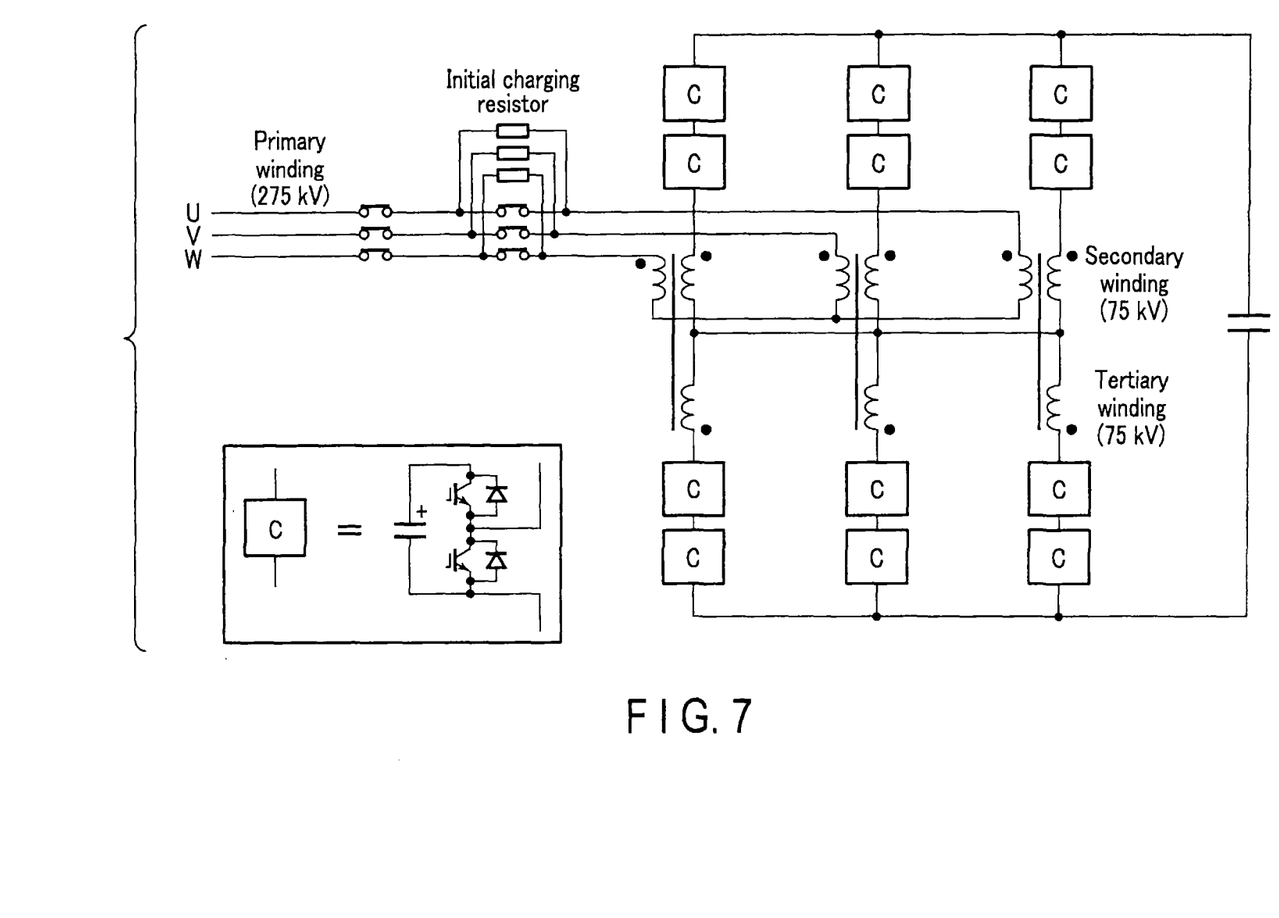
FIG. 7 is a view showing a configuration example of a conventional electric power converter.

As a method of solving this problem, a main circuit configuration shown in FIG. 7 is proposed. In this configuration, a single-phase three-winding transformer is provided in each of the U, V, and W phases. By using this method, it is possible to provide a small-sized electric power converter capable of outputting a voltage/current waveform with a low level of harmonics without a harmonic suppression filter while eliminating a high-cost, and large-sized reactor such as a buffer reactor.

CITATION LIST

Non Patent Literature

Non Patent Literature 1: Abstract of CIGRE 2009, Paper 401 (Multilevel Voltage-Sourced Converters for HVDC and FACTS Applications: Siemens AG)

SUMMARY OF INVENTION

Technical Problem

However, in this circuit form, although it is necessary to subject the capacitor of the converter unit constituting the converter to initial charging by the power system at the time of first starting, an initial charging resistor configured to suppress an excessive rush current of the charging current needs to be provided according to specifications allowing insulation of a high voltage of the power system voltage, and hence there is a problem that high cost, and upsizing of the converter are brought about.

Furthermore, in the circuit configuration shown in FIG. 7, a triple harmonic current or the like unintentionally output from the converter functions as an exciting current of the transformer to thereby make the system voltage not a sinusoidal voltage but a distorted voltage and, as a result, there has been a fear that the power system is adversely affected.

Accordingly, an object of an embodiment is to provide a small-sized electric power conversion apparatus capable of outputting a voltage/current waveform with a low level of harmonics without a harmonic suppression filter while eliminating a high-cost, and large-sized reactor such as a buffer reactor, and further making an initial charging rush current suppression resistor low in cost, and small in size.

Solution to Problem

According to an embodiment, an electric power conversion apparatus is configured to convert electric power from DC or AC to AC or DC, and includes, wherein when a constituent element constituted of a leg in which two switching elements provided with self-arc-extinguishing capability are connected in series, and a capacitor connected in parallel with the leg is made a converter unit, and a constituent element formed by connecting one or more converter units in series is made a phase arm, a phase arm on the positive side, a single-phase four-winding transformer, and a phase arm on the negative side are included in each of three phases, one end of the phase arm on the positive side is connected to the positive side of a secondary winding of the four-winding transformer, and the other end thereof is connected to a DC positive side terminal, one end of the phase arm on the negative side is connected to the positive side of a tertiary winding of the four-winding transformer, and the other end thereof is connected to a DC negative side terminal, the negative sides of the secondary windings and the negative sides of the tertiary windings of the four-winding transformers are connected to each other, and are connected to each other between the three phases, the negative sides of the primary windings of the four-winding transformers are connected to each other, quartic windings of the four-winding transformers are connected to each other in series to form delta connection, a first AC circuit breaker connected between the positive sides of the primary windings of the four-winding transformers, and a high-voltage AC power system; and a second AC circuit breaker, and rush current suppression resistors connected in series between the quartic windings of the four-winding transformers, and a low-voltage AC power supply.

DESCRIPTION OF EMBODIMENTS

Hereinafter, electric power conversion apparatus according to embodiments will be described with reference to the drawings.

Figure 1:
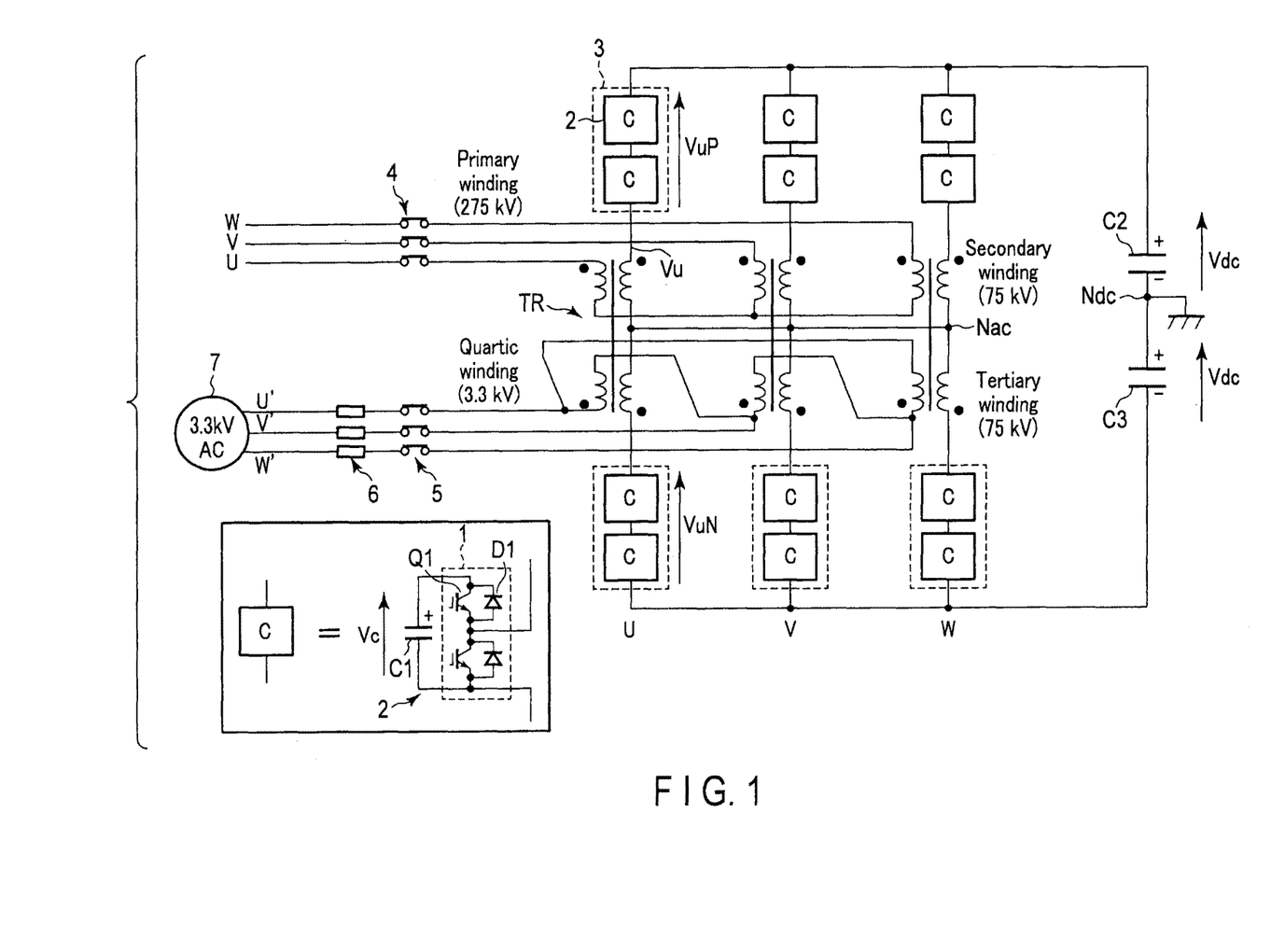
FIG. 1 is a view showing the configuration of an electric power conversion apparatus according to a first embodiment.

FIG. 1 is a view showing the configuration of an electric power conversion apparatus according to a first embodiment. Hereinafter, this electric power conversion apparatus (converter) will be described as an electric power conversion apparatus (converter) configured to power-convert three-phase 50 Hz power supply into DC power through an isolating transformer. However, this electric power conversion apparatus can operate also as an electric power inverter configured to convert DC power into three-phase 50 Hz AC power by control of reversing the polarity of a current command value or the like.

A phase arm 3 is constituted by connecting N (N=2 in this example) converter units in series, the converter unit being constituted of a chopper bridge unit converter 2 formed by connecting a leg 1 in which two switching elements Q1 provided with self-arc-extinguishing capability are connected in series, and a capacitor C1 in parallel with each other.

One end of a phase arm on the positive side is connected to a positive side terminal of a DC power supply (C2, C3), and the other end thereof is connected to the positive side of a secondary winding of a single-phase four-winding transformer TR. One end of a phase arm on the negative side is connected to a negative side terminal of the DC power supply, and the other end thereof is connected to the positive side of a tertiary winding of the transformer TR. The negative side of the secondary winding and the negative side of the tertiary winding are connected to each other, and are connected to each other in each of, and between the U, V, and W phases as an AC neutral point Nac. Quartic windings of the transformers TR in the U phase, V phase, and W phase are connected to each other in series to form a delta-connection configuration.

The negative side ends of primary windings of the transformers TR in the U phase, V phase, and W phase are directly connected to each other in the form of a short circuit, and the positive side ends of the primary windings are connected to a 50 Hz system power supply through a primary-winding circuit breaker 4 as input ends of the U phase, V phase, and W phase.

Next, an operation of the first embodiment will be described below. In this embodiment, a case where the phase arm 3 is constituted of two converter units 2 as shown in FIG. 1 will be described. A description will be given by taking a case where the turn ratio between the primary winding, and secondary winding is 1:1 as an example. Besides, operations of the U phase, V phase, and W phase are identical to each other, and hence a description will be given below by taking the U phase as an example.

A neutral point Ndc of the DC power supply (C2, C3) is made the voltage criterion of the grounding point, and a voltage of the AC output point viewed from the grounding point is made Vu. It should be noted that control is carried out in such a manner that the potential of the AC neutral point Nac is identical to the potential of the DC neutral point Ndc. The positive and negative voltages of the DC power supply are made Vdc, the capacitor voltage of the converter unit 2 is made Vc, the output voltage of the converter unit connected to the positive side power supply side is made VuP, and the output voltage of the converter unit connected to the negative side power supply side is made VuN. Then, the following relationship is established.

The positive side converter unit voltage $$VuP = Vdc - VuRef$$

(VuRef is an AC voltage command value output of which is desired)

At this time, the output voltage Vu is output according to the following condition.

$$Vu = Vdc - VuP = Vdc - (Vdc - VuRef) = VuRef$$

The negative side converter unit voltage $$VuN = Vdc - VuRef$$

(VuRef is an AC voltage value output of which is desired)

At this time, the output voltage Vu is output according to the following condition.

$$Vu = -Vdc + VuN$$
$$= -Vdc + (Vdc - VuRef)$$
$$= -VuRef$$

The AC load current Iu flows through each of the positive side converter unit, and negative side converter unit.

At this time, in the capacitor of the positive side converter unit, discharge and charge are carried out by the power PowerP expressed by the following formula.

$$\mathrm{Power}P = VuP \times Iu = (Vdc - VuRef) \times Iu$$

When calculation is carried out for a case where VuRef and Iu are in phase, i.e., a case where the operation is carried out with a power factor of 1, the mean value of powerP in an AC period becomes a negative value. That is, when output voltage control is carried out in only the above operation mode, the capacitor voltage mean value of the positive side converter unit cannot be kept constant, and the operation cannot be continued.

Likewise, regarding the negative side converter unit capacitor voltage, the mean value of PowerN in an AC period at the time of the operation with a power factor of 1 becomes a positive value, and the capacitor voltage mean value cannot be kept constant, and the operation cannot be continued.

In order to solve the problem, a DC charging/discharging current is made to flow from the DC power supply positive side along a path of the positive side converter unit, positive side single-phase transformer, negative side single-phase transformer, negative side converter unit, and DC power supply negative side to thereby make the capacitor voltage mean value constant.

More specifically, a DC capacitor voltage mean value constant control correction value $\Delta V fc \mathrm{Control}$ is calculated by using the following formula to correct and output the positive side, and negative side converter unit output voltage commands VuP, and VuN. That is, this $\Delta V fc \mathrm{Control}$ is added to the output voltage commands VuP, and VuN.

$$\Delta V fc \mathrm{Control} = G(s) \times (VCref - VCu\_\mathrm{AVE})$$

Vcref is a converter unit capacitor voltage command, and is a value set in advance.

VCu_AVE is a capacitor voltage mean value of all the U phase positive and negative converter units.

G(s) is a control gain, and s is a Laplace operator. This is suitable for proportional-plus-integral control.

This operation is identical to the conventional case and, in the conventional case, a buffer reactor configured to prevent a DC circulating current from rapidly increasing needs to be particularly provided. However, conversely, in the circuit form of this embodiment, the single-phase transformer serving as an isolating transformer is included in the path of the DC circulating current, and hence a rapid increase in the DC circulating current does not occur in principle by the leakage inductance component of the transformer.

Next, initial charging of the capacitor according to this embodiment will be described below.

The quartic winding of the transformer TR is provided for the initial charging. The quartic winding is constituted as a fourth winding of the single-phase transformer TR of each of the U phase, V phase, and W phase. The terminal of the quartic winding on the positive side of the U phase is connected to the terminal on the negative side of the W phase, the terminal on the positive side of the V phase is connected to the terminal on the negative side of the U phase, and the terminal on the positive side of the W phase is connected to the terminal on the negative side of the V phase, whereby a delta winding configuration is obtained.

The positive terminal of the quartic winding of each of the U phase, V phase, and W phase is connected to a low-voltage AC power supply 7 through a quartic winding circuit breaker 5, and low-withstanding voltage initial charging resistor 6. As this AC power supply 7, a general power supply of 3.3 kV or the like is used. Alternatively, a variable-voltage power supply such as an inverter or the like may also be used.

Next, an operation to be carried out at the time of initial charging will be described below by using FIG. 2, and FIG. 3. At the time of startup of the electric power converter, all the capacitors of the converter units are discharged, and all the voltages are zero.

The primary winding circuit breaker 4 is in the release state and, first of all, the quartic winding circuit breaker 5 is turned on. Then, the capacitors of the converter units are charged while the charging current is flowing from the 3.3 kV three-phase AC power supply 7, and passing through the initial charging rush current suppression resistor 6, transformer quartic winding, transformer secondary winding, and transformer tertiary winding.

Figure 2:
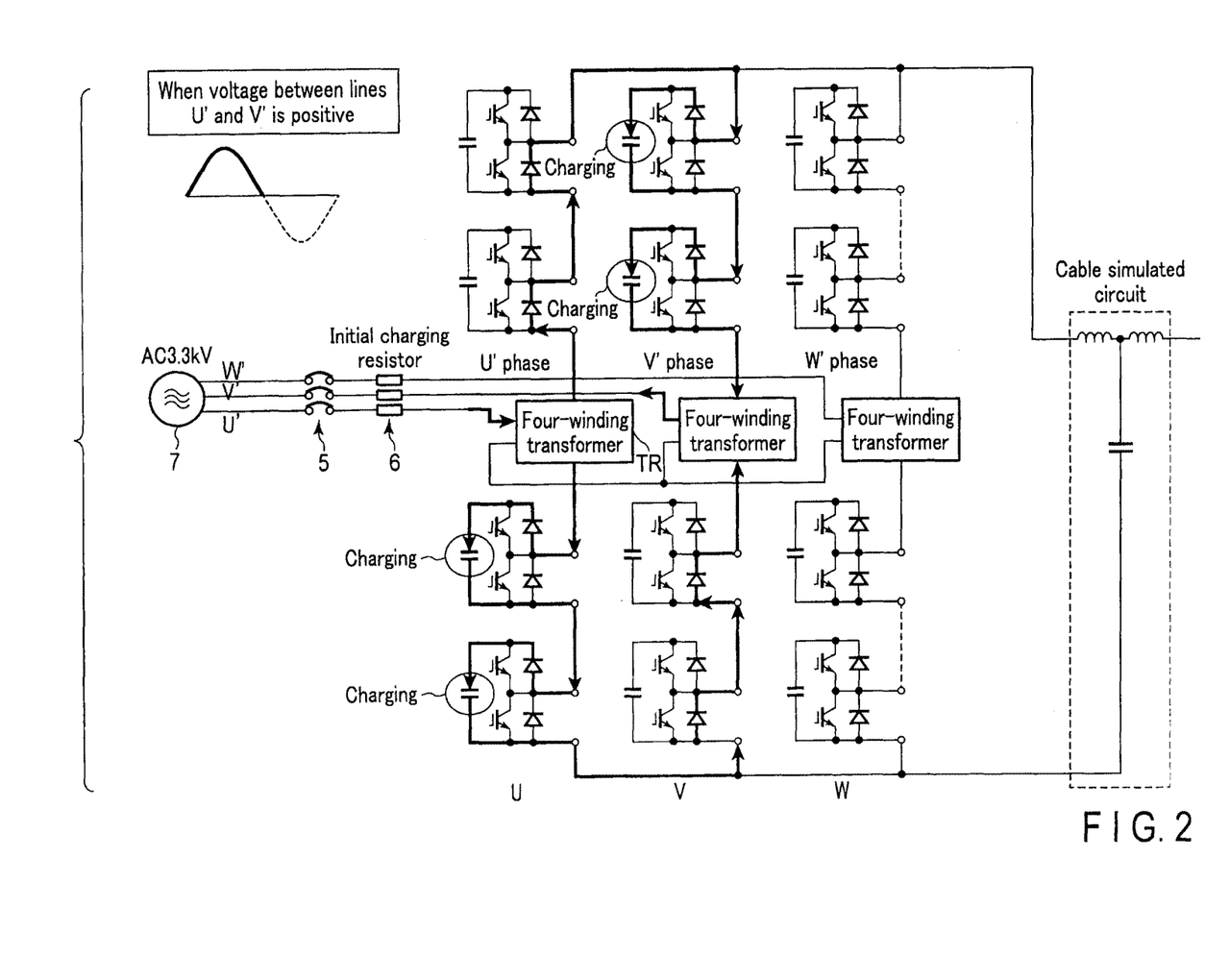
FIG. 2 is a view showing an operation to be carried out at the time of initial charging.
Figure 3:
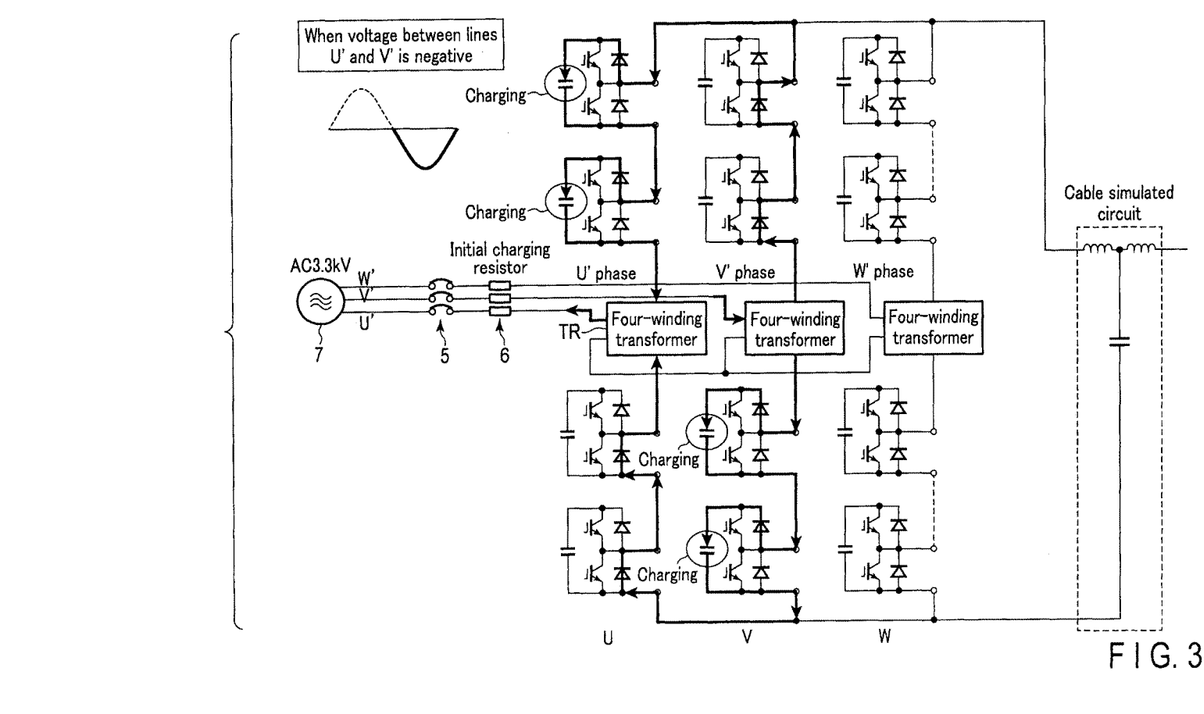
FIG. 3 is a view showing an operation to be carried out at the time of initial charging.

FIG. 2 shows a charging path of the case where the voltage between the lines U' and V' is positive, i.e., the U' phase voltage is higher than the V' phase voltage. At this time, the capacitors of the U phase negative side phase arm, and V phase positive side phase arm are charged. FIG. 3 shows a charging path of the case where the voltage between the lines U' and V' is negative, i.e., the U' phase voltage is lower than the V' phase voltage. At this time, the capacitors of the U phase positive side phase arm, and V phase negative side phase arm are charged. It should be noted that the capacitors of the W phase are also charged in the same manner by the interaction between the W phase and V phase.

After the capacitors are charged up with a time constant T=C×R (sec) to be determined by the initial charging rush current suppression resistor 6, and capacitance C corresponding to the number of series connected capacitors of the conversion units, the primary winding circuit breaker 4 is turned on. Thereafter, the electric power conversion apparatus shifts to the normal running operation.

By the configuration described above, it becomes possible to provide a small-sized electric power conversion apparatus capable of outputting a voltage/current waveform with a low level of harmonics without a harmonic suppression filter while eliminating a high-cost, and large-sized reactor such as a buffer reactor, and further making an initial charging resistor for rush current suppression low in cost, and small in size.

Figure 4:
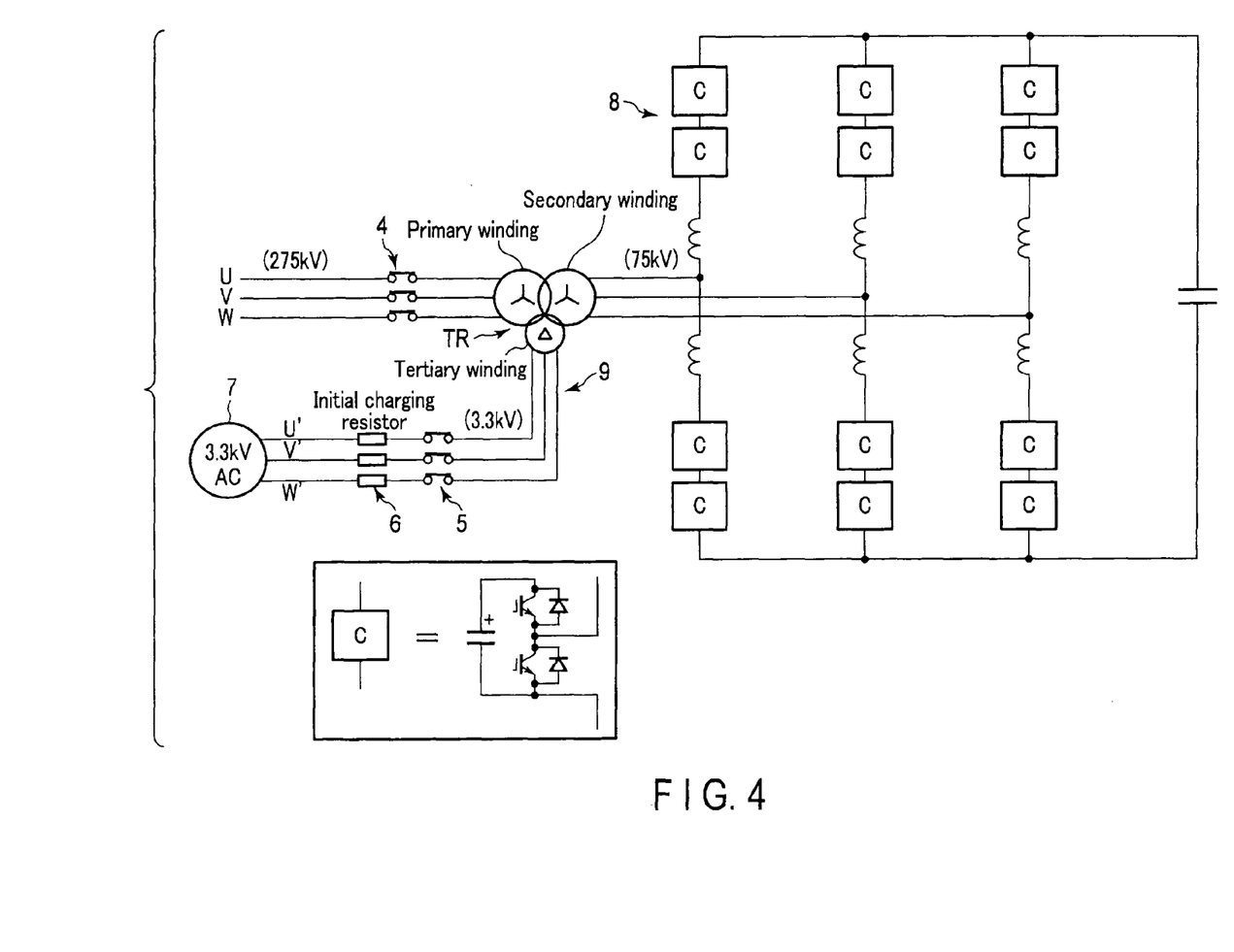
FIG. 4 is a view showing the configuration of an electric power conversion apparatus according to a second embodiment.

FIG. 4 shows the configuration of a second embodiment in which an initial charging circuit 9 identical to the first embodiment is applied to a conventional modular multilevel converter 8 shown in FIG. 6. A transformer TR includes primary windings, and secondary windings which are constituted by star connection, and tertiary windings constituted by delta connection. The primary windings are connected to a high-voltage AC power system through an AC circuit breaker 4, the secondary windings are connected to AC terminals of the modular multilevel converter, and the tertiary windings are connected to a low-voltage AC power supply 7 through a circuit breaker 5, and initial charging resistors.

By the configuration described above, it becomes possible to provide a small-sized electric power converter capable of outputting a voltage/current waveform with low harmonics without a harmonic suppression filter, and further making an initial charging rush current suppression resistor low in cost, and small in size.

Figure 5:
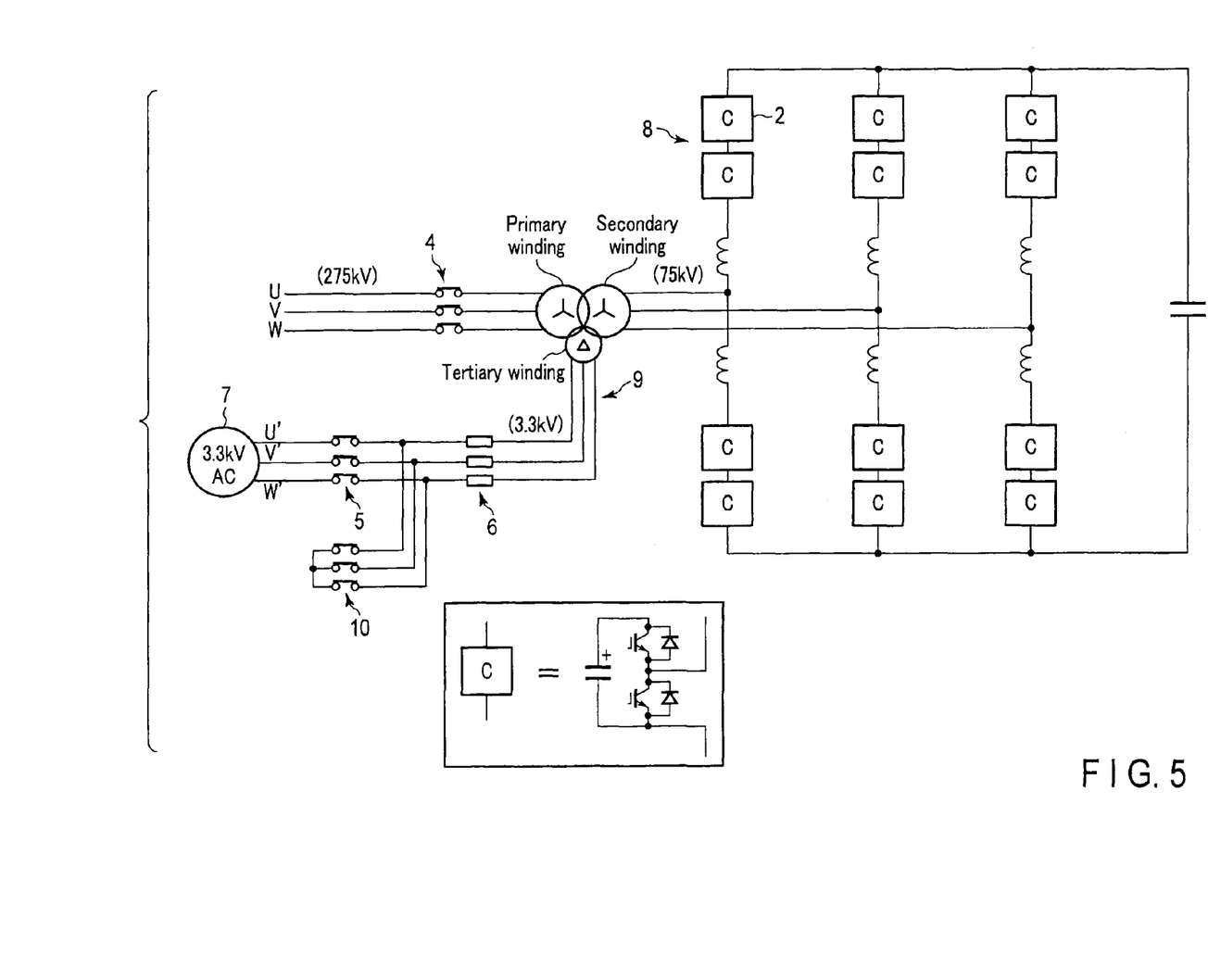
FIG. 5 is a view showing the configuration of an electric power conversion apparatus according to a third embodiment.

FIG. 5 is a view showing the configuration of an electric power conversion apparatus according to a third embodiment.

In this electric power conversion apparatus, in contrast to the initial charging circuit 9 of the electric power conversion apparatus of FIG. 4, a three-phase short-circuiting switch 10 is provided between a circuit breaker 5, and initial-charging/discharging resistors 6, the circuit breaker 5 is provided on the three-phase AC power supply 7 side, and the initial-charging/discharging resistors 6 are provided on the tertiary winding side of the transformer.

After the primary winding circuit breaker 4 is opened to stop the operation of the electric power conversion apparatus, a capacitor C1 of a converter unit 2 is still charged up to a high-voltage. Then, when it is desired to discharge the capacitor of the converter unit within a short time, the circuit breaker 5 is opened, and the three-phase short-circuiting switch 10 is turned on to thereby operate the electric power conversion apparatus. Then, a discharging current flows through each initial-charging/discharging resistor 6, and the capacitor C1 is discharged. Accordingly, the electric power conversion apparatus is kept in a safe state. It should be noted that the configuration used to discharge the capacitors after the operation is stopped can also be applied to the first embodiment of FIG. 1 in the same manner. That is, in the configuration of FIG. 1, it is sufficient if the arrangement of the initial charging resistors 6, and the circuit breaker 5 is reversed, and a three-phase short-circuiting switch 10 is provided between the circuit breaker 5, and the initial charging resistors 6 arrangement of which is reversed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

1 . . . leg, 2 . . . converter unit, 3 . . . phase arm, 4, 5 . . . circuit breaker, 6 . . . initial charging resistor, 7 . . . Low-voltage AC power supply, 8 . . . modular multilevel converter, 9 . . . initial charging circuit, and 10 . . . three-phase short-circuiting switch.

What is claimed is:

1. An electric power conversion apparatus configured to convert electric power from DC or AC to AC or DC, wherein
when a constituent element constituted of a leg in which two switching elements provided with self-arc-extinguishing capability are connected in series, and a capacitor connected in parallel with the leg is made a converter unit, and a constituent element formed by connecting one or more converter units in series is made a phase arm, a phase arm on the positive side, a single-phase four-winding transformer, and a phase arm on the negative side are included in each of three phases,
one end of the phase arm on the positive side is connected to the positive side of a secondary winding of the four-winding transformer, and the other end thereof is connected to a DC positive side terminal,
one end of the phase arm on the negative side is connected to the positive side of a tertiary winding of the four-winding transformer, and the other end thereof is connected to a DC negative side terminal,
the negative sides of the secondary windings and the negative sides of the tertiary windings of the four-winding transformers are connected to each other, and are connected to each other between the three phases,
the negative sides of the primary windings of the four-winding transformers are connected to each other,
quartic windings of the four-winding transformers are connected to each other in series to form delta connection,
the electric power conversion apparatus comprising:
a first AC circuit breaker connected between the positive sides of the primary windings of the four-winding transformers, and a high-voltage AC power system; and
a second AC circuit breaker, and rush current suppression resistors connected in series between the quartic windings of the four-winding transformers, and a low-voltage AC power supply.

2. The electric power conversion apparatus according to claim 1, wherein
at the time of startup of the electric power conversion apparatus, the second AC circuit breaker is turned on in a state where the first AC circuit breaker is opened, whereby capacitors constituting the respective converter units are charged up with electric charges by the power from the low-voltage AC power supply while current limiting is being carried out by the rush current suppression resistors and, thereafter the first AC circuit breaker is turned on.

3. The electric power conversion apparatus according to claim 1, wherein
the rush current suppression resistors are connected to the quartic windings, the second AC circuit breaker is connected to the low-voltage AC power supply, and a three-phase short-circuiting switch is provided between the rush current suppression resistors, and the second AC circuit breaker.

4. An electric power conversion apparatus configured to convert electric power from DC or AC to AC or DC, comprising:
when a constituent element constituted of a leg in which two switching elements provided with self-arc-extinguishing capability are connected in series, and a capacitor connected in parallel with the leg is made a converter unit,
an electric power converter in which arms each constituted by connecting the plurality of converter units in series are connected in parallel in three phases, a positive side end of each arm is made a DC positive side terminal, a negative side end of each arm is made a DC negative side terminal, and a middle point terminal is made an AC terminal;
transformers including primary windings constituted of a star-connection configuration, and secondary windings constituted of a star-connection configuration, and tertiary windings constituted of a delta-connection configuration, the secondary windings being connected to the AC terminal of the electric power converter;
a first AC circuit breaker connected between the primary windings, and a high-voltage AC power system; and
a second AC circuit breaker, and rush current suppression resistors connected in series between the tertiary windings, and a low-voltage AC power supply.

* * * * *